United States Patent [19]

Ogasawara

[11] Patent Number: 4,982,074

[45] Date of Patent: Jan. 1, 1991

[54] METHOD OF RECORDING POSITION INFORMATION OF LAST TRACK RECORDED WITH DATA IN DIRECTORY AREA

[75] Inventor: Yutaka Ogasawara, Yokohama, Japan

[73] Assignee: Canon Kabushiki Kaisha, Tokyo, Japan

[21] Appl. No.: 225,825

[22] Filed: Jul. 29, 1988

[30] Foreign Application Priority Data

Aug. 11, 1987 [JP] Japan .................. 62-199166
Aug. 11, 1987 [JP] Japan .................. 62-199167

[51] Int. Cl.$^5$ .................. G06K 7/10; G11B 27/28
[52] U.S. Cl. .................. 235/454; 235/494; 369/59; 369/54; 369/58
[58] Field of Search .................. 369/32, 59, 47, 48, 369/54, 58, 275.3; 235/487, 494, 454, 475

[56] References Cited

U.S. PATENT DOCUMENTS

| | | | |
|---|---|---|---|
| 4,545,044 | 10/1985 | Satoh et al. | 369/32 |
| 4,611,314 | 9/1986 | Ogata et al. | 369/48 |
| 4,730,293 | 3/1988 | Pierce et al. | 235/487 |
| 4,733,386 | 3/1988 | Shimoi | 369/47 |
| 4,740,942 | 4/1988 | Ogino et al. | 369/48 |
| 4,791,622 | 12/1988 | Clay et al. | 369/48 |
| 4,800,258 | 1/1989 | Suzuki et al. | 235/475 |

FOREIGN PATENT DOCUMENTS

| | | |
|---|---|---|
| 0072704 | 2/1983 | European Pat. Off. . |
| 0227380 | 7/1987 | European Pat. Off. . |
| 0251666 | 7/1988 | European Pat. Off. . |
| 3545996 | 7/1986 | Fed. Rep. of Germany . |
| 61-240408 | 10/1986 | Japan . |
| 62-131317 | 6/1987 | Japan . |
| 62-131318 | 6/1987 | Japan . |
| 62-131319 | 6/1987 | Japan . |

*Primary Examiner*—Stuart S. Levy
*Assistant Examiner*—Robert A. Weinhardt
*Attorney, Agent, or Firm*—Fitzpatrick, Cella, Harper & Scinto

[57] ABSTRACT

A method of recording data is disclosed wherein data is recorded onto a recording medium having a plurality of tracks provided side by side. The data recording method includes sequentially recording a series of data on a track from one side of a medium; writing index information, including position information, of a last recorded track, after the series of data are completely recorded, in an area of the medium different from the area where the data is recorded; reading out the position information and seeking the last track on the basis of the position information read out and recording the next data on a track next to the sought last track.

6 Claims, 4 Drawing Sheets

METHOD OF RECORDING POSITION INFORMATION OF LAST TRACK RECORDED WITH DATA IN DIRECTORY AREA

BACKGROUND OF THE INVENTION

1. Field of the Invention

The present invention relates to a method of recording data in a card-like optical recording medium (i.e., an optical card) or the like and, more particularly, to a method of recording data from an end track of a medium having a plurality of parallel tracks.

2. Related Background Art

A paper tape, a magnetic tape, and the like are popular as conventional recording media for sequentially recording data. When data is recorded in these recording media, an END mark, a field, or the like which represents an end of data at the end of recorded data is recorded to represent the end of the recorded data. In data reproduction, the END mark or the like is detected to detect the end of data.

When additional data is recorded in such a recording medium, the end of the already recorded data must be detected. For example, an END mark is searched in, e.g., a magnetic tape to detect the end of data. From the position of the END mark, additional data is recorded and an END mark is recorded at the end of the additionally recorded data.

However, in a large-capacity recording medium such as an optical card, a long period of time is required to search the last track (to be referred to as an EOT (End Of Track)) recorded with data, since detection is performed from the beginning of the tape. When additional data is to be written from the EOT, detection of the EOT is inevitable since recording is started from the track next to the EOT. In a system wherein a card is frequently loaded in or unloaded from a record-reproduction device, the EOT must be detected whenever the card is loaded therein or unloaded therefrom, thus increasing the processing time.

SUMMARY OF THE INVENTION

It is an object of the present invention to solve the conventional problems described above and to provide a method of quickly searching a last position of the previously recorded data when data are sequentially recorded in a recording medium.

In order to achieve the above object of the present invention, there is provided a method of recording data, comprising the steps of: sequentially recording a series of data from a track on one side of a medium; writing index information including position information of a last track when the series of data are completely recorded in an area of the medium different from the area storing the data; reading out the position information and seeking the last track on the basis of the written position information; and recording the next data from a track next to the sought last track.

DETAILED DESCRIPTION OF THE PREFERRED EMBODIMENT

Figure 1:
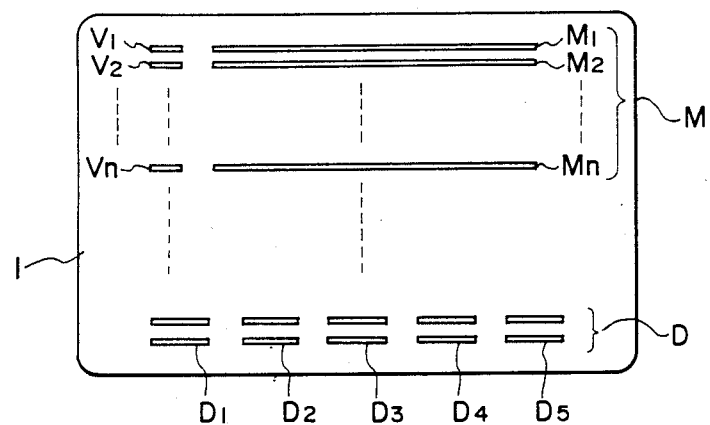
FIG. 1 is a schematic plan view showing an optical card used in the present invention.

FIG. 1 is a schematic plan view of an optical card used in a method of recording data according to the present invention.

Referring to FIG. 1, a main data recording portion M consisting of data tracks $M_l$ to $M_n$ and an auxiliary data recording portion D consisting of directories $D_1$ to $D_5$ recorded with index data for controlling the data files are formed on an optical card 1. Verification marks (to be referred to as V marks hereinafter) $V_l$ to $V_n$ are respectively formed on lines extending from the data tracks $M_l$ to $M_n$ to represent that the data are normally recorded.

Figure 2A:
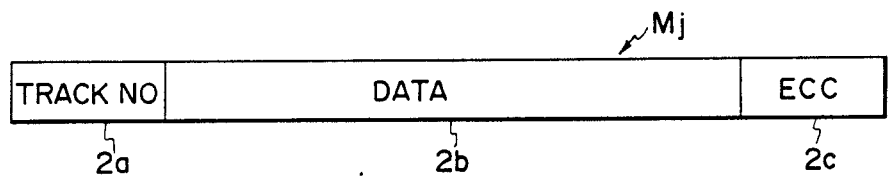
FIGS. 2A is schematic view showing an example of a recording format of a data track according to the present invention.
Figure 2B:
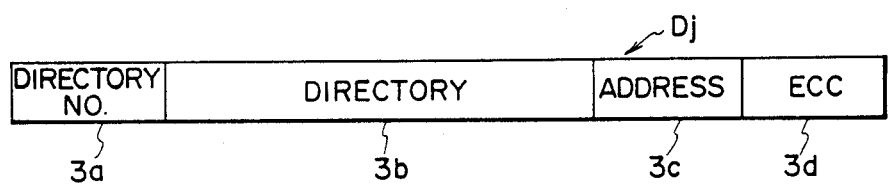
FIG. 2B is a schematic view showing an example of a directory according to the present invention.

Data are recorded in the data tracks $M_l$ to $M_n$ of the main data recording portion M one by one downward from the uppermost track in FIG. 1. The directories $D_l$ to $D_n$ of the auxiliary data recording portion D are designed such that five directories can be recorded in one track in this embodiment. The directories are recorded from the left to the right in one track. When the five directories are recorded, a recording cycle is shifted to the upper track, so that the directories are sequentially recorded to the upper tracks. FIGS. 2A and 2B respectively show examples of a data format of a data track $M_j$ (j=1 to n) and a directory $D_j$ according to the present invention shown in FIG. 1.

Referring to FIG. 2A, a track number area 2a is an area for recording the address number of this data track. The address number "1" is written for the data track $M_1$, the address number "2" is written for the data track $M_2$, and so on. A data area 2b is an area for recording main data. An ECC area 2c is an area for recording an error correction code.

Referring to FIG. 2B, a directory number area 3a is an area for recording a directory serial number. The directory serial number "1" is written for the directory $D_1$, "2", for the directory $D_2$, and so on. A directory area 3b is an area for recording contents of a series of data (i.e., a file), e.g., a file name, data, and a file size. An EOT address area 3c is an area for recording an address number of a track of the EOT of the main recording portion M. An ECC area 3d is an area for recording an error correction code.

Figure 3:
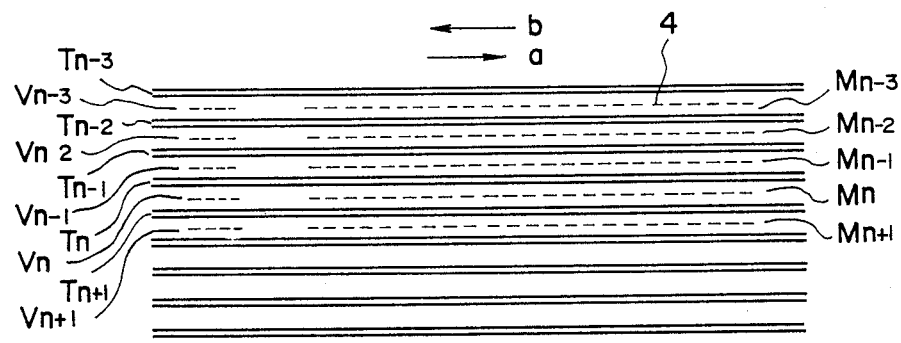
FIG. 3 is an enlarged view of a data recorded portion of the optical card shown in FIG. 1.

FIG. 3 is an enlarged view of the main data recording portion M in FIG. 1. Optically detectable pits 4 are formed in the data tracks $M_{n-3}$ to $M_{n+1}$ when a light beam spot modulated in accordance with recording information is scanned on the optical card 1. In order to accurately record or reproduce this recording pit 4, the illumination position of the recording pit 4 must be controlled in a direction perpendicular to the scanning direction. For this purpose, there are tracking tracks $T_{n-3}$ to $T_{n+1}$.

A method of recording data in the main data recording portion will be briefly described with reference to FIG. 3.

Auto tracking (to be referred to as AT hereinafter) is performed along the tracking track $T_n$ in a direction indicated by an arrow a so as to move the light beam modulated with the recording information, thereby recording the data in the data track $M_n$. When one-track data is completely recorded, the move direction of the beam spot is then reversed, so that the beam is scanned in a direction indicated by an arrow b. The recorded data is reproduced and compared with the recording data, thus performing verification. If the verification result represents a normal operation, the V mark $V_n$ representing normal recording is recorded on a line extending from the data track $M_n$. However, if normal recording cannot be performed due to a defect of the optical card and an error occurs during verification, the V mark $V_n$ is not recorded, and the recording cycle is shifted to the next track $M_{n+1}$. The same data is recorded in the track $M_{n+1}$, and the same verification as described above is performed.

Figure 4:
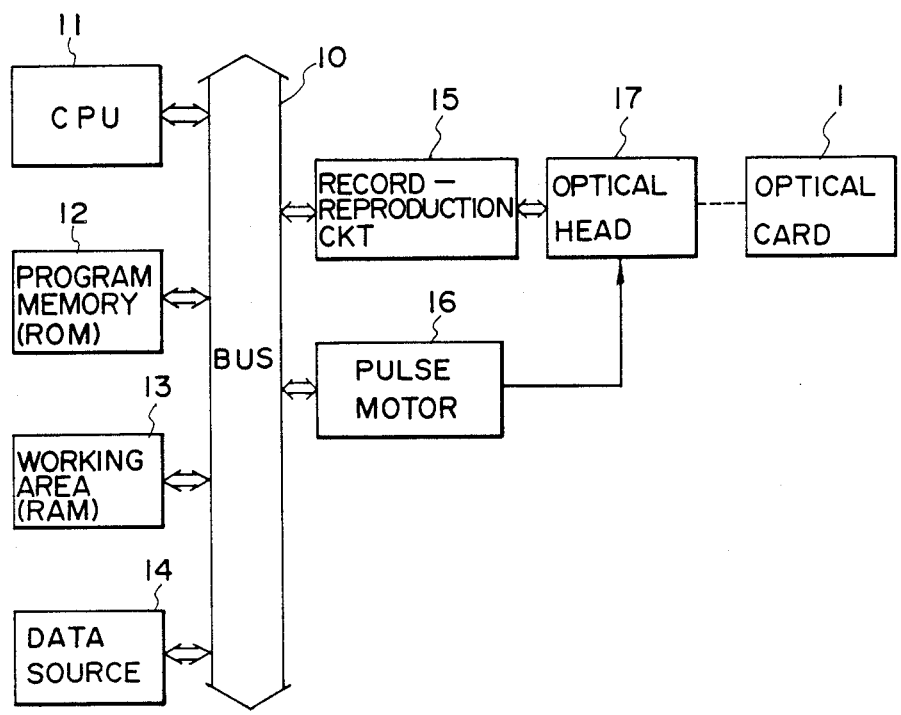
FIG. 4 is a block diagram showing an arrangement of a data record-reproduction device for practicing the method of the present invention.

FIG. 4 is a block diagram showing a circuit arrangement of a data record-reproduction device for an optical card which employs the above data recording scheme. Recording of data into the optical card and reproduction of data therefrom are controlled by a microcomputer.

A central processing unit (CPU) 11, a memory (ROM) 12 for storing programs, a working area (RAM) 13 including registers utilized for various operations under the control of the CPU 11, a data source 14 for storing recording data to be recorded in the optical card 1, a record-reproduction circuit 15, and a pulse motor 16 are connected to a bus 10.

An optical head 17 is controlled by the record-reproduction circuit 15 and the pulse motor 16 and emits a light beam on the optical card 1 to record data therein or reproduce it therefrom.

The operations of the record-reproduction device will be described with reference to FIGS. 5 and 6.

Figure 5:
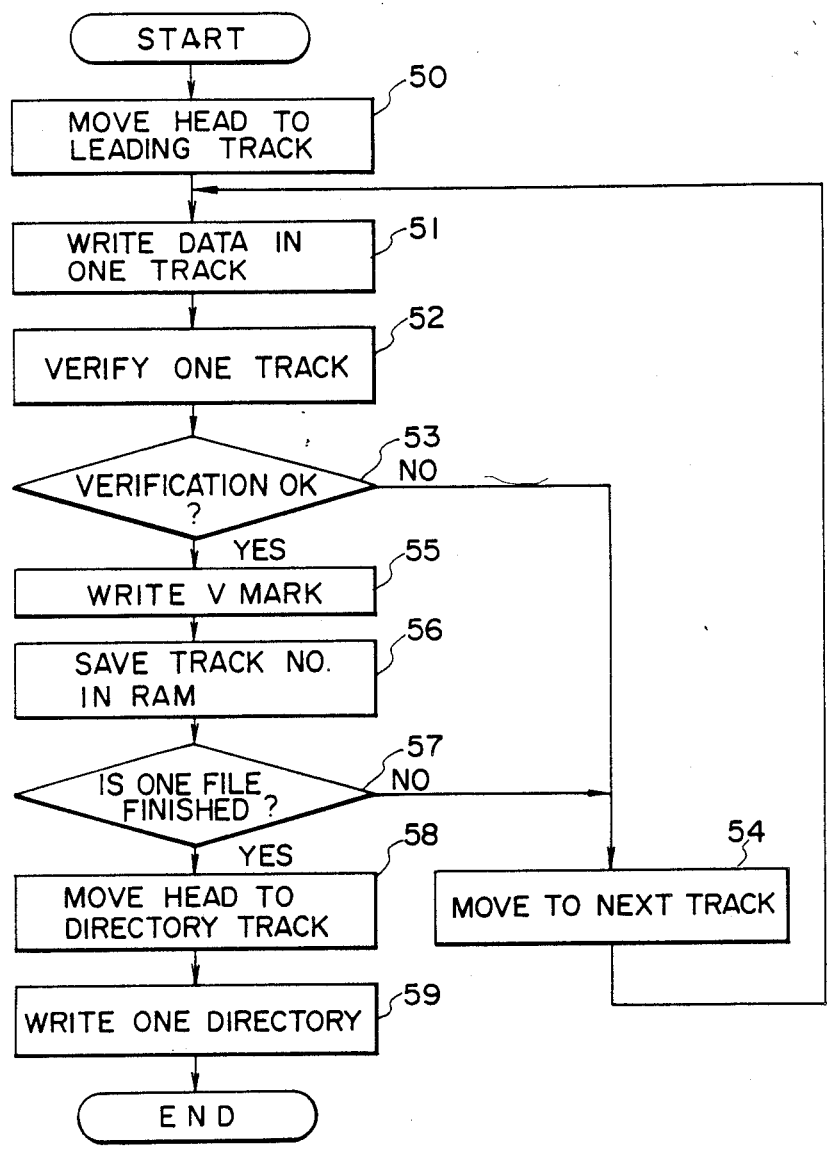
FIGS. 5 is a flow chart explaining recording of a track number of an EOT in the directory according to the method of the present invention.

FIG. 5 is a flow chart for recording a track number of the EOT in the EOT address area 3c of the directory D.

A sequence for writing data in a blank optical card 1 will be described.

When a new optical card 1 is loaded in the record-reproduction device shown in FIG. 4, in step 50, the optical head 17 is moved to the leading track $M_1$ of the main data recording portion M.

In step 51, data "1" is recorded in the track number area 2a of the data track $M_1$, one-track data from the data source 14 is recorded in the data area 2b, and an error correction code is recorded in the ECC area 2c.

In step 52, the CPU 11 performs verification to check if the data is correctly recorded. If the data is not correctly recorded, NO is obtained in step 53, and the flow advances to step 54. However, if the data is correctly recorded, YES is obtained in step 53. The V mark $V_1$ is recorded in step 55, and the flow advances to step 56.

In step 56, the track number "1" of the track $M_1$ recorded in step 51 is saved as a temporary EOT in the RAM 13.

The CPU 11 determines in step 57 whether one-file data from the data source 14 is completely recorded. If NO in step 57, the flow advances to step 54. However, if YES in step 57, the flow advances to step 58.

In step 54, the optical head 17 is moved to the next track $M_2$, and the same operations from step 51 are repeated until one-file data is completely recorded. For this reason, the contents of the RAM 13 are updated every time the operations are repeated.

When one-file data recording is finished, the flow advances to step 58. In step 58, the optical head 17 is moved to the leading track $D_1$ of the directory. In step 59, predetermined data are respectively written in the areas 3a to 3d of the leading track $D_1$ in accordance with the formats described above. In this case, the temporary EOT track number saved in the RAM 13 is recorded as an EOT address in the EOT address area 3c.

Figure 6:
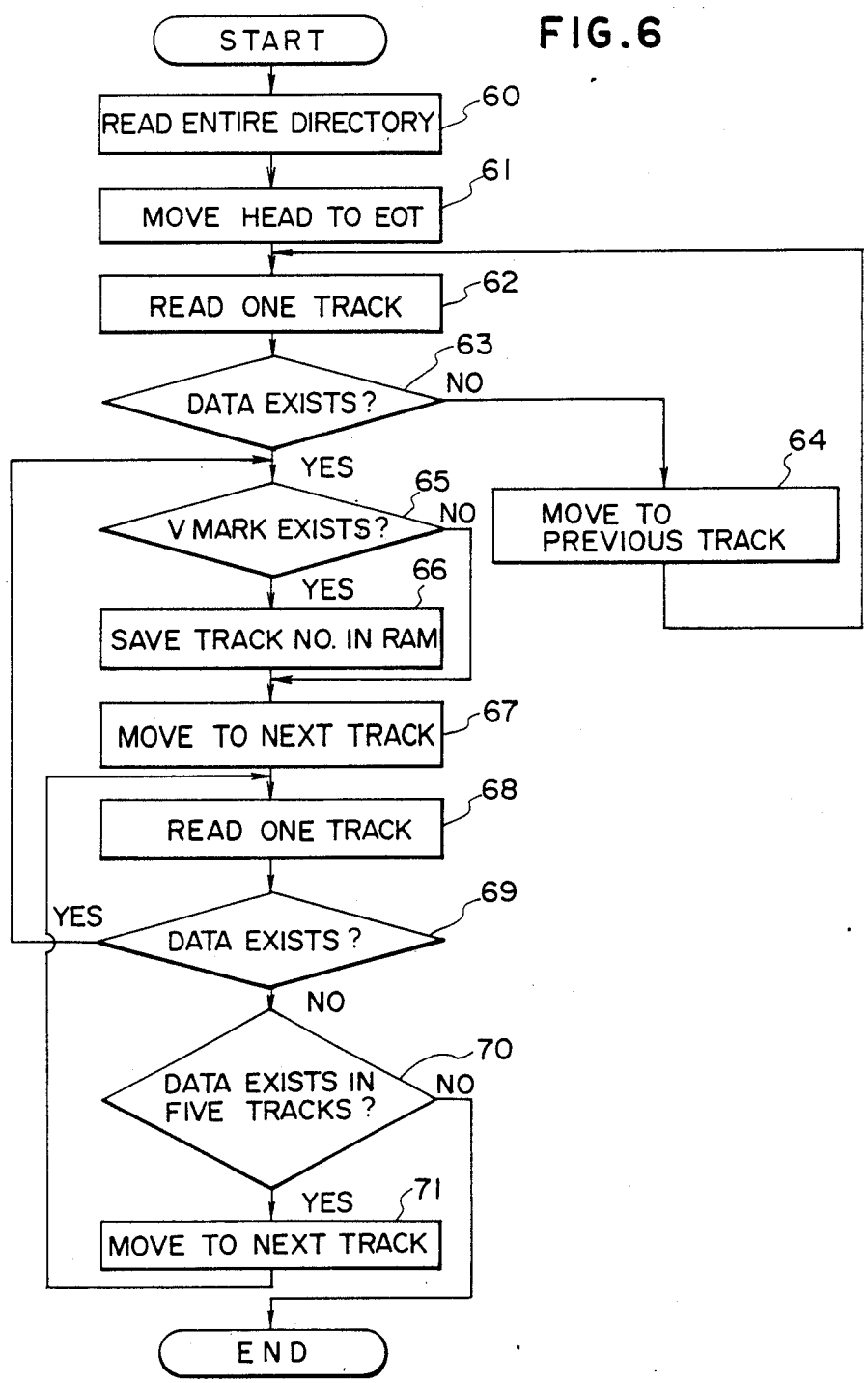
FIG. 6 is a flow chart explaining a method of detecting the EOT having been recorded according to the method of the present invention.

FIG. 6 is a flow chart showing a method of detecting the EOT when the optical card is loaded in the record-reproduction device after the sequence in FIG. 5 is completed.

In step 60, the entire directory D of the card 1 is read. In a system for controlling the files in accordance with the directory information, the file structure can be determined by reading the entire directory.

In step 61, the optical head 17 is moved by the pulse motor 16 to the EOT position recorded in the EOT address area 3c representing the position of the last directory of the directories read in step 60. In this case, the detected EOT position is different from the true EOT position due to an error of the pulse motor 16, dimensional errors of the optical card 1, and an AT error.

When data recording is interrupted before completion, due to an operation failure of a data recording device, the directory of this data is not written. In this case, data is written after a track corresponding to the EOT track number written in the directory. The EOT stored in the directory is different from the actual EOT. In order to prevent this drawback, from step 62, the CPU 11 determines whether the EOT stored in the directory is the actual EOT. In this embodiment, when data are not continuously recorded in five consecutive tracks from the track $M_j$ recorded with data, this track is detected as an EOT track.

More specifically, in step 62, AT is performed at the position of the optical head 17 to which it has been moved in step 61. One-track data is reproduced, and the V mark is detected.

The CPU 11 determines in step 63 whether data is recorded in this data track. If YES in step 63, the flow advances to step 65 and the subsequent steps. However, if NO in step 63, the light beam spot is moved to the previous track in step 64. The operations are repeated from step 62.

The CPU 11 determines in step 65 whether the V mark is present in the reproduced data track. If YES in step 65, its track number is saved in the RAM 13 in step 66, and the flow advances to step 67. However, if NO in step 65, the flow jumps to step 67.

In step 67, the light beam spot is moved to the next data track, and data is reproduced from this data track in step 68.

The CPU 11 determines in step 69 whether data exists in this track. If YES in step 69, the same operations from step 65 are repeated However, if NO in step 69, the flow advances to step 70. The CPU 11 determines in step 70 whether data exists in five tracks. If NO in step 70, the light beam spot is moved to the next track in step 71. The flow then returns to step 68, and the above operations are repeated until data exits in the five tracks.

However, if YES in step 70, the track number saved in the RAM 13 is determined to be the EOT, thereby completing EOT detection.

When data is added to the data tracks of the optical card, the optical head is moved to the track next to the EOT detected in this sequence. Data is additionally recorded in operations from step 51 in FIG. 5.

According to the present invention as has been described above, the EOT position information is recorded in the directory to immediately search the last position of the recorded track from the EOT position information. Therefore, operations such as additional recording of data and the like can be easily performed.

The present invention is not limited to the particular embodiment described above. Various changes and modifications may be made within the spirit and scope of the invention. In the above embodiment, the EOT is detected by detecting five nonrecorded tracks. However, the number of nonrecorded tracks can be arbitrarily determined in accordance with precision of the device and the like. When formation of a nonrecorded track in the recorded area by recording errors is taken into consideration, the number of nonrecorded tracks is preferably 2 or more.

The present invention includes such changes and modifications without departing from the scope of the appended claims.

What is claimed is:

1. A method of recording data onto a recording medium including a recording area having a plurality of recording tracks arranged side by side, said method comprising the steps of:

sequentially recording a series of data on a recording track from one side of the medium to another;

writing index information in an area of the recording medium different than the recording area, subsequent to the series of data being completely recorded on a recording track in said recording step, the index information including position information of a last recorded track;

reading out the position information written in said writing step and seeking the last recorded track on the basis of the position information read out;

recording another series of data on a track next to the last recorded track sought in said seeking step; and checking a predetermined number of nonrecorded tracks after the last recorded track, prior to recording information on the track next to the last recorded track, the predetermined number of nonrecorded tracks being at least two.

2. A method according to claim 2, wherein the step of recording data comprises the steps of checking whether normal recording is performed in every track and recording the same data in a track next to the checked track when normal recording is not performed.

3. A method according to claim 2, wherein the step of checking comprises the steps of reading out the data recorded in the recording medium and comparing the data read out with original data.

4. A method according to claim 3, wherein the recording medium comprises a card-like medium and said method further comprises the step of reciprocally scanning the medium with a light beam spot for recording and reproducing data such that data is recorded during forward movement of the reciprocal scanning, and the step of checking comprises reading out the recorded data during backward movement of the reciprocal scanning.

5. A method according to claim 1, wherein the position information comprises a track address number.

6. A method according to claim 5, further comprising the step of writing the track address number in a track during data recording.

* * * * *

UNITED STATES PATENT AND TRADEMARK OFFICE
CERTIFICATE OF CORRECTION

PATENT NO. : 4,982,074

DATED : 1/1/91

INVENTOR(S) : Yutaka Ogasawara

It is certified that error appears in the above-identified patent and that said Letters Patent is hereby corrected as shown below:

Column 1, line 35, "inevitable" should read --inevitable,--.

Column 2, line 6, "FIGS. 5" should read --FIG. 5--.

Column 4, line 62, "repeated However," should read --repeated. However,--;
        line 68, "exits" should read --exits--.

Column 6, line 14, "claim 2," should read --claim 1,--.

Signed and Sealed this

Fifth Day of January, 1993

Attest:

DOUGLAS B. COMER

Attesting Officer      Acting Commissioner of Patents and Trademarks